United States Patent [19]

Kim et al.

[11] Patent Number: 5,544,658
[45] Date of Patent: Aug. 13, 1996

[54] DOPPLER ULTRASOUND VELOCITY ESTIMATION

[75] Inventors: Jin H. Kim, Issaquah; Dong-Chyuan Liu, Mercer Island, both of Wash.

[73] Assignee: Siemens Medical Systems, Inc., Iselin, N.J.

[21] Appl. No.: 529,777

[22] Filed: Sep. 18, 1995

[51] Int. Cl.$^6$ .................................................... A61B 8/00
[52] U.S. Cl. ............................... 128/661.09; 73/861.25
[58] Field of Search .................... 128/661.08, 661.09, 128/661.10, 662.01, 633, 660.04, 660.05; 367/100, 99, 901; 364/516, 517, 524, 413.25; 73/861.25, 602

[56] References Cited

U.S. PATENT DOCUMENTS

| 4,763,282 | 8/1988 | Rosenberg | 364/524 |
| 4,800,891 | 1/1989 | Kim . | |
| 5,245,587 | 9/1993 | Hutson | 367/100 |
| 5,479,926 | 1/1996 | Ustuner et al. | 128/660.04 |

OTHER PUBLICATIONS

D. C. Liu et al, "Modified Autocorrelation Method Compared With Maximum Entropy Method and RF Cross–Correlation Method as Mean Frequency Estimator for Doppler Ultrasound;" 1991 Ultrasonics Symposium; pp. 1285–1290.

Bonnefous, O. et al.; "Time Domain Formulation of Pulse–Doppler Ultrasound and Blood Velocity Estimation by Cross Correlation;" Ultrasonic Imaging; vol. 8; pp. 73–85; 1986.

*Primary Examiner*—George Manuel

[57] ABSTRACT

A spatial-temporal doppler velocity estimation method expands the detectable frequency range by extending the frequency boundary at which aliasing artifacts may occur. In various embodiments the detectable frequency range is extended beyond the Nyquist limit. To do so, multiple velocity estimation functions are defined. One function is the conventional function typically bound by the Nyquist limit. For additional functions, the (n–1)-th echo is spatially shifted with respect to the n-th echo, (i.e., temporal/spatial pulse-pairs are averaged). For example, in one embodiment a shift of $+\Delta$ is inserted to define one additional estimation function, while a shift of $-\Delta$ is inserted to define another additional estimation function. A power function then is calculated for each velocity estimation function. The estimation function having the highest power is selected for use in deriving the doppler shift frequency of a given sample point. By selecting a one of the K+1 velocity estimation functions with the highest power, the detectable frequency range, f, becomes: $-(2^K/2)f_s < f < (2^K/2)f_s$, where $f_s$ is the Doppler sampling frequency.

14 Claims, 4 Drawing Sheets

DOPPLER ULTRASOUND VELOCITY ESTIMATION

BACKGROUND OF THE INVENTION

1. Field of the Invention

This invention relates to velocity estimation using doppler ultrasound techniques, and more particularly to a spatial vector averaging method and apparatus for estimating blood flow velocities in an ultrasound medical diagnostic imaging system.

2. Description of the Related Art

Medical diagnostic ultrasound systems generate images of anatomical structures within a patient's body by scanning a target area with ultrasound signals. Typically, ultrasound signals on the order of typically 3.0 MHZ are transmitted into a patient. Returning echo signals then are formed into a beam-pattern and analyzed to convey image and/or flow characteristics of the scanned area.

Doppler Ultrasound

Doppler ultrasound is the field of detection, quantization, and medical evaluation of tissue motion and blood flow. Specifically, doppler ultrasound is used to determine the presence or absence of flow, the direction and speed of flow, and the character of flow. Continuous wave doppler ultrasound (i.e., cw-doppler) uses continuous-wave ultrasound signals. Pulsed doppler ultrasound uses pulsed-wave ultrasound signals. Applications of doppler ultrasound are found in virtually all medical specialties, including cardiology, neurology, radiology, obstetrics, pediatrics and surgery.

Doppler ultrasound is based upon the doppler effect, which is a change in frequency caused by the relative motion among a wave source, receiver and reflector. As applied to medical applications, an ultrasound transducer embodying the source and receiver is stationary, while blood or tissue fluid is the moving reflector. The change in frequency detected is the difference between the transmitted ultrasound signal frequency and the reflected ultrasound signal frequency. Such change is a function of the transmitted signal frequency, the propagation speed of the transmitted signal through the patient's anatomy, the speed of flow in the range gate and the angle of incidence between the ultrasound signal and the direction of blood flow.

A doppler ultrasound instrument includes a voltage generator (e.g., oscillator) with an oscillator gate that generates electrical signal inputs to a transducer. The oscillator gate allows respective pulses of several voltage cycles to pass to the transducer for conversion into respective ultrasound pulses. Ultrasound pulses used for doppler have minimum pulse lengths of approximately five cycles and typical pulse lengths of 25–30 cycles. The multiple cycles within a pulse are used to determine the doppler shift of returning echoes. Voltage pulses resulting from received echoes are processed in a receiver, where they are amplified and compared in frequency with the transmitted signal.

The echoes sensed at the transducer undergo spectral analysis of frequency components. Typically, several frequency components are present. If all flow within a range gate is of a uniform speed and direction, then there is one frequency component. The character of flow in vessels, however, is determined by the vessel size and the uniformity of its walls. Changes in size, turns and abnormalities, such as the presence of plaques and stenoses, alter the character of the flow. Conventionally, flow is characterized as plug, laminar, parabolic, disturbed, and turbulent. Accordingly, portions of flow often are moving at different speeds and, sometimes, in different directions. Thus, many different doppler shifts, and thus frequency components, occur.

In certain instances, artifacts occur in doppler ultrasound. Artifacts as used herein are anything that is not properly indicative of the structures of the flows imaged or sampled. More specifically, artifacts are incorrect presentations of flow or image information. Artifacts are caused by some characteristic of the sampling or imaging technique. Although other imaging and doppler artifacts occur, addressed here is a common doppler ultrasound artifact known as aliasing.

Aliasing is the improper representation of information that has been insufficiently sampled. The sampling can be of a spatial or temporal nature. As the sampling rate is reduced, for example, the ability to resolve the details of an object, then the general character of the object, is lost. In cases this results in the object being mischaracterized (e.g., having a false appearance or assumed identity—an alias). An example of temporal aliasing occurs in, for example, a rotating object such as a fan. The blades of the fan are observed to rotate at various speeds and in reverse directions when viewed with a strobe light flashing at various rates.

The Nyquist limit or Nyquist frequency describes the minimum sampling rate required to avoid aliasing. Specifically, there must be at least two samples per period of the wave being observed. For a complicated signal, such as a doppler echo signal containing many frequencies, it is preferable that the sampling rate be sufficient to include at least two samples for each period of the highest doppler-shift frequency present. Stated differently, if the highest doppler-shift frequency present in a signal exceeds one half the pulse repetition frequency, then aliasing occurs. On a doppler spectral display, frequency aliasing is manifested as a "wrapping around" of the spectrum so that blood of high velocity in one direction instead appears to be going in the opposite direction. This invention addresses anti-aliasing in noisy environments.

Doppler Velocity Estimation Methods

One known method for velocity display is to use Fast Fourier Transform ("FFT") techniques to process the echo signals reflected from a target volume so as to generate a numerical display. This method is severely limited because velocity is determined only for a small sample volume. Real-time imaging estimating velocity in an area larger than the sample volume is highly desirable.

Doppler velocity estimators often use time domain processing techniques in which a series of N repetitive pulses separated by time periods, T, are transmitted toward a moving target along a given scan direction. Other than FFT, other time-domain approaches use zero-crossing estimators or autocorrelation (pulse-pair) algorithms.

The autocorrelation function of a digitized doppler signal is given by equation (1):

$$R(T;nT,m\Delta) = \sum_{n=1}^{N} z[nT,m\Delta]z^*[(n-1)T,m\Delta] \quad (1)$$

where,

T=pulse repetition interval;

n=n-th pulse;

N=number of temporal samples averaged;

Δ=time interval in spatial direction;

m=m-th time interval; and z=pulse doppler echo.

The autocorrelation occurs as the temporal averaging over N time periods of an m-th sample and the same m-th sample at a prior time period (n−1)T. The maximum detectable doppler frequency that can be detected from the phase of Equation (1) is limited to one-half the pulse repetition frequency (i.e., 1/(2T)). Although autocorrelation is recognized as providing the best real-time performance of these time-domain approaches, it suffers from a relatively low frame rate and the need for many echoes to estimate slower blood-flow velocities. It also results in the usual pulse doppler aliasing limitation. Inventors J. Kim and D. C. Liu describe a modified autocorrelation method in "Modified Autocorrelation Method Compared With Maximum Entropy Method and RF Cross-Correlation Method as Mean Frequency Estimator for Doppler Ultrasound," 1991 Ultrasonics Symposium; (IEEE 1051-0117/91/0000-1285, pages 1285–1290) Therein they describe an autocorrelation process with an added spatial averaging dimension.

Their modified autocorrelation function of a digitized doppler signal is given by equation (2):

$$R(T;nT,m\Delta) = \sum_{m=1}^{M} \sum_{n=1}^{N} z[nT,m\Delta]z^*[(n-1)T,m\Delta] \quad (1)$$

where,

M=the number of spatial samples averaged;

N=the number of temporal samples averaged.

In this 2-dimensional spatial-temporal velocity estimation procedure, N data samples are averaged over the doppler time after the formation of the pulse-pair signal. The resultant vectors then are averaged in the spatial vector domain. Such modified autocorrelation procedure improves anti-aliasing performance in highly noisy environments. Such improvement is based upon the averaging out of amplitude fluctuations in the noisy environment.

Terminology

Pulse-pair, as used herein, refers to the pair of echo signals being autocorrelated. Equations (1) and (2) above each use the following two signals as the pulse pair:

z[nT,mΔ]

z*[(n−1)T,mΔ]

Temporally-displaced pulse-pair, as used herein, refers to the relation of the two echo signals forming the pulse-pair. Note that z and z* correspond to the same spatially-located sample mΔ, but at different times nT and (n−1)T. Thus, the pulse-pair are temporally-displaced.

Temporal averaging, as used herein, refers to autocorrelating the pulse-pairs over time. In equations (1) and (2) above the pulse-pairs are temporally averaged over N samples, as indicated by:

$$\sum_{n=1}^{N}$$

Spatial averaging, as used herein, refers to autocorrelating the pulse-pairs over a spatial dimension. In equation (2) above, the pulse-pairs are spatially averaged over M samples, as indicated by:

$$\sum_{m=1}^{M}$$

Spatial-temporal averaging and temporal-spatial averaging, as used herein refer to autocorrelating the pulse-pairs over both time and space. Thus, in equation (2) above, the pulse-pairs are spatial-temporal averaged over M spatial samples and N temporal samples, as indicated by:

$$\sum_{m=1}^{M} \sum_{n=1}^{N}$$

SUMMARY OF THE INVENTION

According to the invention, a spatial-temporal doppler velocity estimation method expands the detectable frequency range by extending the frequency boundary at which aliasing artifacts occur. Conventionally, the detectable frequency range is plus/minus one-half the sampling frequency. According to one embodiment of this invention the detectable frequency range is doubled to plus/minus the sampling frequency. In other embodiment, the detectable frequency range is larger yet, being plus/minus 2K times the sampling frequency.

According to one aspect of the invention, additional spatial-temporal velocity estimations are performed with the conventional averaging of equation (2). One of the multiple estimations then is selected as the valid estimation able to avoid aliasing at high sampling frequencies (e.g., frequencies above the Nyquist limit).

According to another aspect of the invention, spatial-temporal displaced pulse pairs are selected to be spatial-temporal averaged. Specifically, the (n−1)-th echo is spatially shifted with respect to the n-th echo for the additional spatial-temporal velocity estimations. For example, in one embodiment a shift of +Δ is inserted to define one additional estimation function, while a shift of −Δ is inserted to define another additional estimation function. In such case, there are three estimation functions:

1. $R(T;nT,m\Delta) = \sum_{m=1}^{M} \sum_{n=1}^{N} z[nT,m\Delta]z^*[(n-1)T,m\Delta] =$ Equation (2)

2. $R(T;nT,m\Delta) = \sum_{m=1}^{M} \sum_{n=1}^{N} z[nT,(m-1)\Delta]z^*[(n-1)T,m\Delta]$ 3. $R(T;nT,m\Delta) = \sum_{m=1}^{M} \sum_{n=1}^{N} z[nT,m\Delta]z^*[(n-1)T,(m+1)\Delta]$ Note that equation (2) is a spatial-temporal average of temporal-displaced pulse-pairs, while the added functions are spatial-temporal averages of spatial-temporal displaced pulse pairs. Thus, spatial-temporal displaced pulse pair, as used herein, refers to two echo signals z, z* in which one echo signal is temporally-displaced and spatially-displaced from the other. Note that above z* is taken at time (n−1)T and z is taken at time, nT, (i.e., temporally-displaced). Also note that above z* is taken at location (m+1)Δ and z is taken at location mΔ, (i.e., spatially-displaced); or at location mΔ while z is taken at location (m−1)Δ, (i.e., spatially-displaced).

According to another aspect of the invention, a power function is calculated for each velocity estimation function (e.g., the original velocity estimation function and the additional velocity estimation functions). The estimation function having the highest power is selected for use in deriving the doppler shift frequency.

According to another aspect of the invention, shifts of ±kΔ are introduced where k=1,K to define 2K additional velocity estimation functions. Thus, 2K+1 velocity estimation functions are executed. By selecting one of the 2K+1 velocity estimation functions with the highest power, the detectable frequency range, f, becomes: $-(2^K/2)f_s < f < (2^K/2)f_s$, where $f_s$ is the Doppler sampling frequency. In practice accurate estimation is achieved for K up to a limited value. The limit of K is dependent upon the flow characteristic within the sampling block. For example, if flow is uniform over an area spanning $\pm\Delta$, then K is limited to 1. If flow is uniform over a larger area, such as $\pm 2\Delta$, then K can be larger, (e.g., 2).

The advantage of the invention is that higher flow velocities can be detected for a given Doppler sampling frequency without the occurrence of aliasing artifacts.

DETAILED DESCRIPTION

Doppler Ultrasound Host Apparatus

Figure 1:
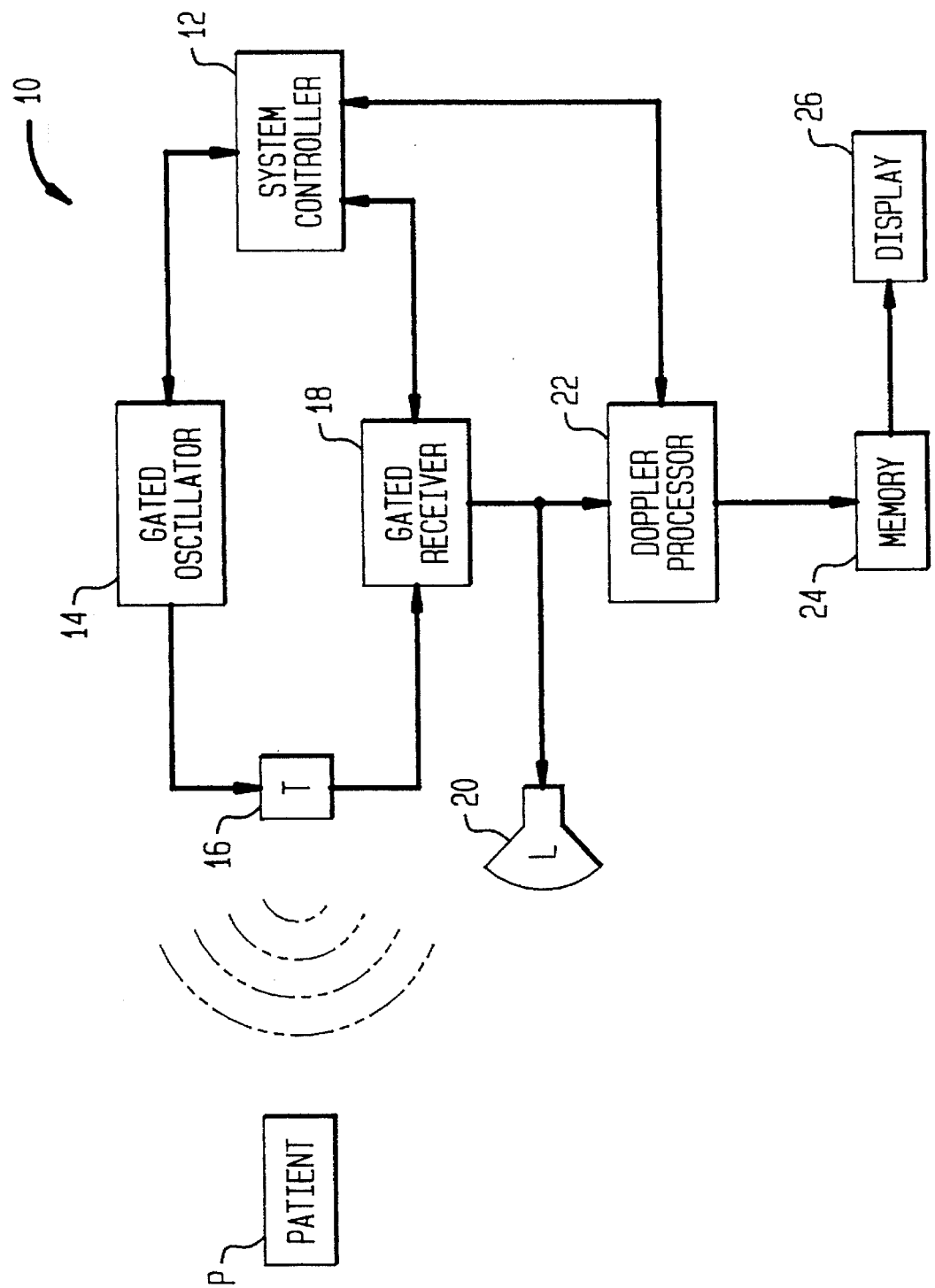
FIG. 1 is a block diagram of an ultrasound medical diagnostic imaging system.

FIG. 1 shows a pulsed doppler ultrasound system 10 used in medical diagnostic applications. The system 10 emits ultrasound pulse wave-forms and detects response echoes to identify motion (e.g., blood flow, fluid motion) within a patient's anatomy. The ultrasound system 10 includes a system controller 12, gated oscillator 14, transducer 16, gated receiver 18, loud-speaker 20, doppler processor 22, memory 24 and display 26. The system controller 12 provides a user interface (e.g., control panel, display menu, keyboard) (not shown) and controls system operations. In operation, the system controller 12 triggers the gated oscillator 14 to generate electrical signals for output to the transducer 16. The transducer converts the electrical signals into a doppler ultrasound transmit pulse wave-pattern. Typically, the transducer is positioned adjacent to and in contact with a patient's anatomy. The transmit pulse wave-pattern propagates into the patient's anatomy where it is refracted, absorbed, dispersed and reflected. The degree of refraction, absorption, dispersion and reflection depends on the uniformity, density and structure of the encountered anatomy. Of interest is the reflected components which propagate back to the transducer 16. These echoes are sensed by the transducer 16 and converted back into electrical signals. The electrical signals are input to a receiver which amplifies the signals.

For pulsed doppler a pulse wave-form is transmitted and echoes responsive to the pulse are detected. To define the pulse the oscillator 14 is gated. To sense echo response to the pulse the receiver 18 also is gated. In effect, time windows are defined for transmitting and receiving ultrasound energy.

The converted echo signals are fed to a doppler processor 22. The doppler processor 22 is a special purpose signal processor or general purpose processor programmed to perform doppler processing functions. The doppler processor 22 performs spectral analysis of the echoes to define the doppler-shift frequency components of the echoes. The doppler shift information then is used to define flow information which is stored in memory 24 and output to a loudspeaker 20 and a display device 26. The loudspeaker 20 converts the echoes back into sound within the human hearing range.

Typically, sonographic imaging subsystems also are included to define an ultrasound system having both doppler capability and sonographic imaging capability. Sonographic subsystem functions include echo processing, color flow processing, image processing, scan conversion and video processing. The sonographic subsystems are not shown in FIG. 1.

Doppler Velocity Estimation—Overview

Figure 2:
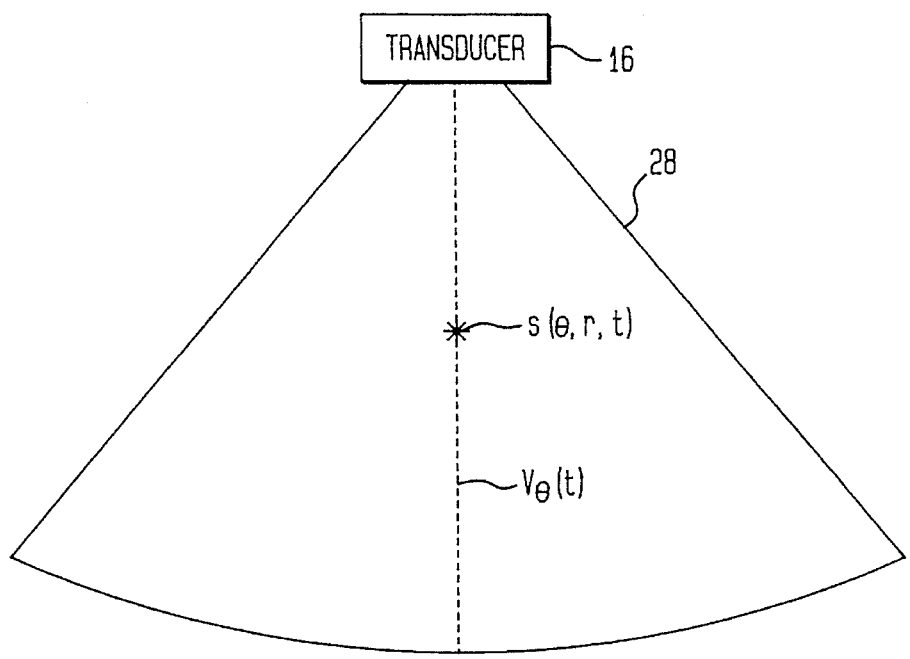
FIG. 2 is a diagram of an ultrasound transducer sector scan.

FIG. 2 shows transducer 16 and a sector scan 28 of a patient area. The transducer 16 emits ultrasound transmit signals having a pulse repetition frequency, PRF. Along a given angular vector, $V_\theta$, the pulse signal is repeated every period, T, where T=1/PRF. Similarly, the transducer 16 detects an echo response z, along a given angular vector, $V_\theta$, every period, T. For doppler ultrasound, it is desirable to determine doppler shift frequency and flow velocity components of the echo signals. Flow velocity is the velocity of, for example, blood, within the scanned patient area.

The doppler shift frequency component is derived using an autocorrelation function. Equation (1) presented in the background section is an autocorrelation of echo signals z for a given vector sample point, $S(\theta,r,t)$ over time.

$$S(\theta,r,t)=d \qquad (3)$$

where,

θ=vector angle;

r=range distance away from the transducer 16 along the given vector;

t=nT (the sample time in units, n, of the pulse repetition period, T);

d=mΔ(the sample position in units, m, of the spatial sampling frequency, Δ).

Specifically, Equation (1) has been used to perform a temporal average of temporally-displaced pulse-pairs. Thus, the echo signal $z(nT,m\Delta)$ at a given point $S(\theta,r,t)$ is autocorrelated with the echo signal $z((n-1)T,m\Delta)$ at the same point for times $t_1$ through $t_n$. The difference between each time, $t_n$, and the next time, $t_{n+1}$, is the pulse repetition period, T. An autocorrelation result is achieved for each sample point of each vector to be included in the ultrasound scan.

Figure 3:
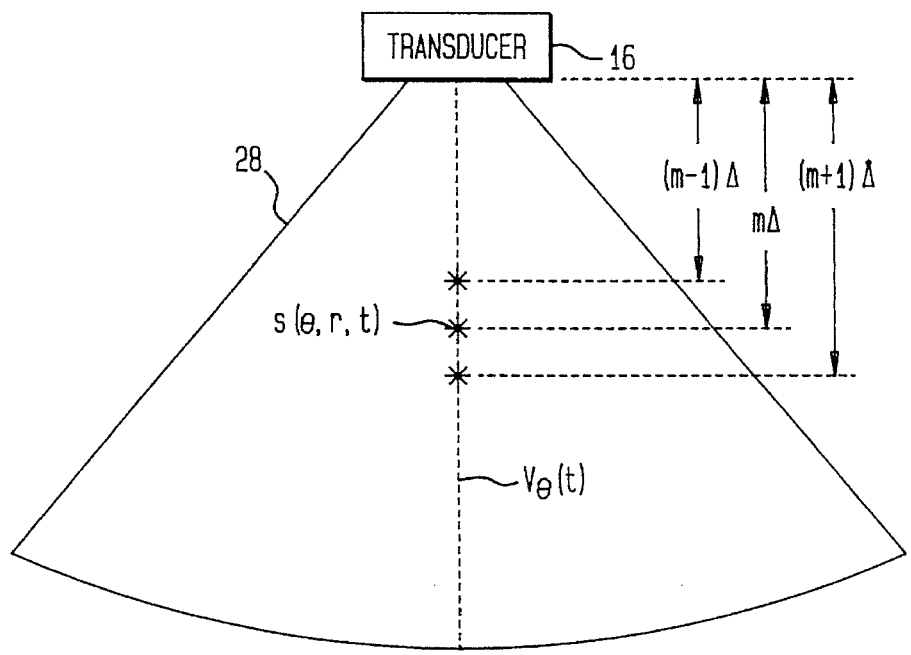
FIG. 3 is a diagram of an ultrasound transducer sector scan.

Equation (2) presented in the background section is a spatial and temporal average of temporally-displaced pulse pairs. Thus, equation (2) differs from equation (1) by adding a spatial dimension. FIG. 3 shows the transducer 16 and sector scan 28 of FIG. 2 for depicting the spatial dimension of the autocorrelation of equation(2). The echo signal $z(nT, m\Delta)$ is autocorrelated over times $t_1$ through $t_n$, and also over samples along the given vector, $V_\theta$. The samples range from a sample 1 to a sample M at a spacing defined by the spatial sampling frequency Δ. Thus, temporally-displaced pulse-pair echo signals $z(nT,m\Delta)$ and $z((n-1)T,m\Delta)$ are autocorrelated for m=1,M to achieve an autocorrelation for a given echo sample $z(nT,m\Delta)$. An autocorrelation result is achieved for each sample point of each vector to be included in the ultrasound scan.

The result of either conventional approach, equation (1) or equation (2), is a complex equation in the form $R(T,nT, m\Delta) = I(t)+jQ(t)$. The function I(t) is an "in-phase" component. The function Q(t) is a quadrature phase component. The doppler shift frequency component of the echo signal at a given sample point is derived by taking the inverse tangent of Q/I for that echo sample.

A shortcoming of both of these conventional approaches is that aliasing occurs at flow velocities greater than the sampling frequency's Nyquist limit. Equation (2) is an improvement over equation (1) by improving anti-aliasing performance in noisy environments. Both are limited, however, to accurate flow velocity detection within the frequency range of equation(4) below:

$$-f_s/2 < f < f_s/2 \qquad (4)$$

Where, $f_s$=Doppler sampling frequency; and
$f$=detectable frequency.

According to this invention, additional steps are added to extend the detectable frequency before aliasing occurs. Specifically, additional spatial-temporal averaging functions are performed for additional pulse-pairs. Whereas the conventional methods of equations (1) and (2) use temporally-displaced pulse-pairs, the velocity estimation method of this invention also uses spatial-temporal displaced pulse-pairs. The results is accurate flow velocity measurement for flow velocity detection frequencies greater than the Doppler sampling frequency's Nyquist limit. According to a preferred embodiment, accurate flow velocity is detected over twice the frequency range of equation (4). In other embodiments the frequency range is extended even further. Thus, this invention is directed to a method of doppler ultrasound flow-velocity estimation with an extended aliasing frequency.

Deriving the Aliasing Extension

The demodulated doppler signal for a given sample $z(nT,t)$ is characterized by equation (5) below:

$$z(nT,t) = e^{-j\omega_d(t-nT)} A(t,n,\omega_0) \qquad (5)$$

where:

$$A(t,n,\omega_0) \equiv \int a(t-\alpha nT-\tau) e^{j\omega_d \tau} \gamma v(\tau) d\tau$$

where, $\omega_d$=the doppler frequency=$\alpha \omega_0$;
$\alpha$=$2v/c$;
$T$=pulse repetition period;
$\alpha T$=doppler phase shift
$t$=time in units, n, of period, T;
$n$=n-th pulse repetition period;
$a$=echo pulse envelope;
$\tau$=sampling time window (i.e., an approximation of t);
$\gamma$=volume scattering coefficient;
$\omega_0$=carrier frequency;
$v$=flow velocity;
$c$=speed of sound in patient's tissue Taking an expectation over the Gaussian random variable $\gamma v$, equation (5) yields an autocorrelation function characterized by equation (6) below:

$$R(T;nT,m\Delta) = e^{j(\omega_d - \omega_0 \alpha)T} \cdot \sigma^2 \cdot [\iint a(-t_1)a(-t_2)\delta(t_1 - t_2 - \alpha T) e^{j\omega_0(t_1-t_2)} dt_2 dt_1] \qquad (6)$$

where, $\sigma^2$=variance of the random scattering coefficient;
$\delta$=Dirac impulse function.

Assuming a rectangular pulse shape with width L for pulse envelope a(t), the statistical expectation is replaced by a spatial integration (averaging) reducing equation (6) to equation (7) below:

$$R(T;nT,m\Delta) = e^{j\omega_d T} \gamma \sigma^2 (L - \alpha T) L \qquad (7)$$

The doppler phase shift is represented by equation (8) below:

$$\alpha T = \alpha_s T + 2\pi m/\omega_0 \qquad (8)$$

Figure 4:
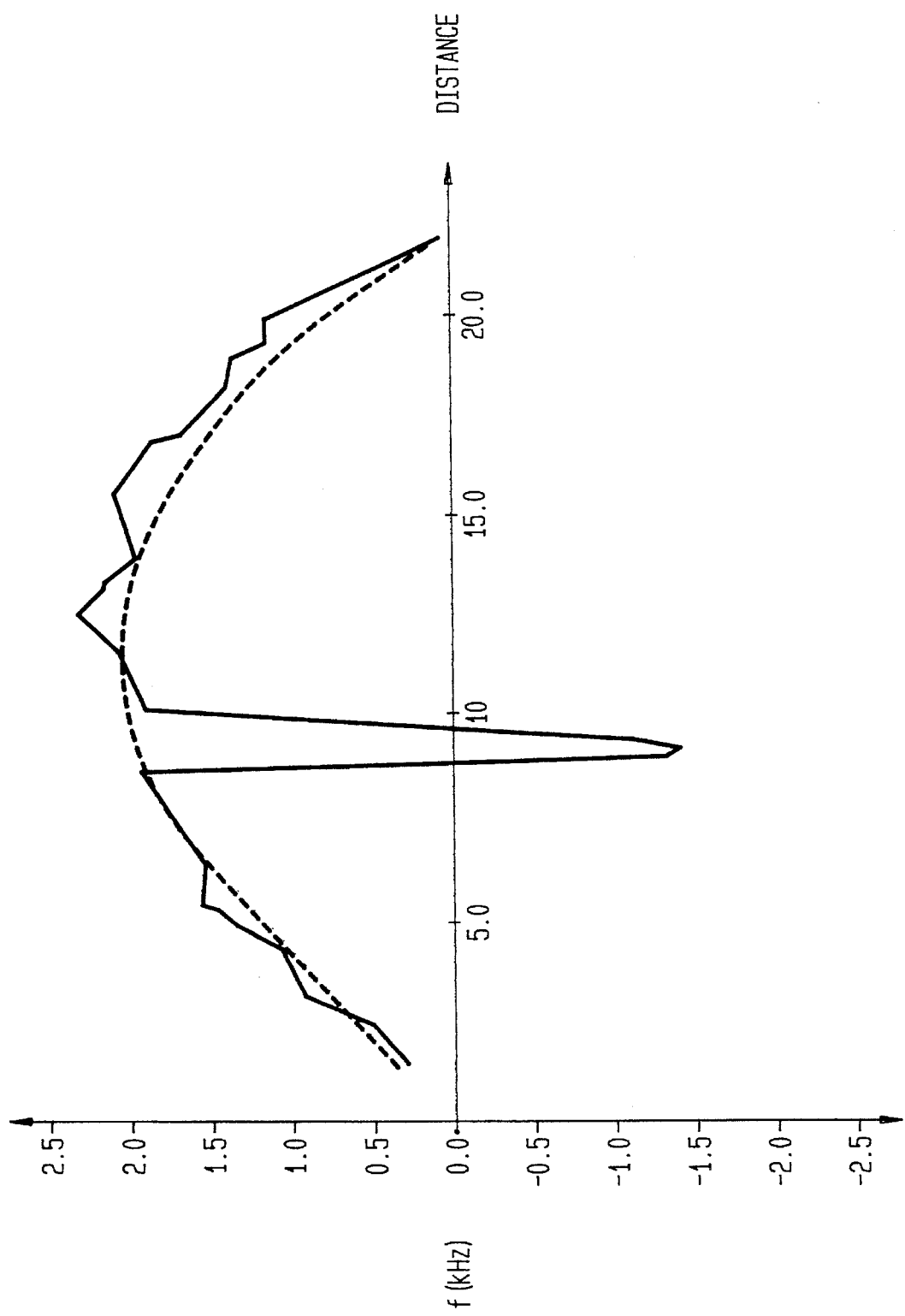
FIG. 4 is a chart of doppler shift frequency with an aliasing artifact.

Taking the inverse tangent of equation (8) yields $\alpha_s T$ as the calculated Doppler shift. However, for high flow velocities, an aliasing artifact manifests as a negative phase shift. FIG. 4 shows a frequency response with the aliasing error.

Equation (8), however, shows that the magnitude of the averaged pulse-pair vectors depends on the pulse shift $\alpha_s T$. If the (n-1)-th echo is shifted by $\xi$ with respect to the n-th echo, then the autocorrelation function is represented by equation (9) below:

$$R(T,\xi;nT,m\Delta) = e^{j(\alpha_s \omega_0 T + 2m\pi)} \sigma^2 [L - (\alpha_s T + (2\pi m/\omega_0) - \xi)]L \qquad (9)$$

where, $\alpha_s \omega_0$ is the aliased doppler frequency.

Equation (9), in turn, reveals that the aliased doppler frequency can be detected by comparing, for example, the magnitudes of three averaging blocks with two spatial-shift variables $\xi = \pm \Delta$, then averaging spatially.

According to the preferred embodiment three such averaging blocks (i.e., velocity estimation methods) are used resulting in a detectable frequency range twice that of the conventional approaches (e.g., see equation 4 above). According to other embodiments additional averaging blocks are used. For each added pair of averaging blocks the detectable frequency range increases. Specifically, the detectable frequency range is described in equation (10) below:

$$-(2^k/2)f_s < f < (2^k/2)f_s \qquad (10)$$

where,

K=the number of pairs of averaging blocks added.

Conventionally one averaging block is used. By adding a pair to make three averaging blocks, the range doubles. By adding another pair to make five averaging blocks the range doubles again. In theory the number of averaging blocks is limited only by the echo signal bandwidth, L. In practice, however, the flow velocity within the sampling window, $\tau$, may vary. For accurate measurement of flow velocity, the scattering within the sampling window is to be uniform. Thus, it is desirable that the sampling window remain small enough that flow within the window is uniform. If several averaging blocks are used to get a wider range of detectable velocities, then velocity measurement accuracy is compromised for flow exhibiting turbulence beyond a threshold level. Accordingly, in the preferred embodiment, three averaging blocks are used. This extends the aliasing frequency enabling accurate velocity measurement even in the presence of high blood-flow turbulence.

In an alternate embodiment, additional averaging blocks are used. To verify the validity of using several averaging blocks, color flow information is analyzed to determine the turbulence of the flow. For turbulence below a prescribed threshold, the number of averaging blocks is increased without compromising measurement accuracy.

Doppler Ultrasound Velocity Estimation with Aliasing Extension

Figure 5:
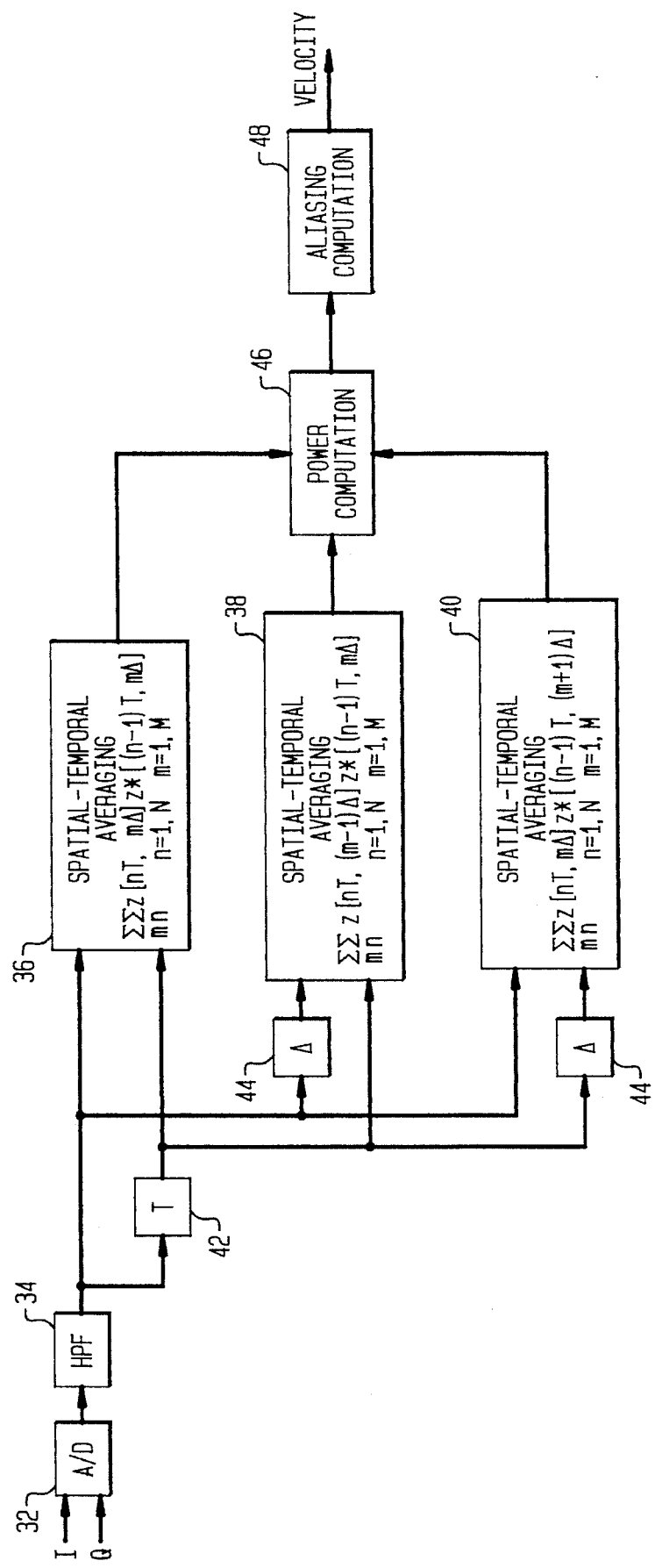
FIG. 5 is block diagram of a velocity estimation method for extending detectable frequency range according to an embodiment of this invention.

FIG. 5 is a block diagram depicting the velocity flow estimation method according to an embodiment having three averaging blocks 36, 38, 40. Ultrasound echoes returning from the scanned patient area are sensed at the transducer 16, and converted to analog electronic signal, then passed through a low-pass filter to obtain in-phase ("I") and quadrature phase ("Q") signals. The I and Q signals are converted to digital format at A/D 32. As the object is to measure blood flow, the digitized signals then are passed through a highpass filter 34 which filters out a portion of the signal corresponding to vessel wall motion.

To derive the flow velocity of a given sample point along a given vector, data samples are input to each of the three velocity estimation processing functions 36, 38, 40. Each function 36–40 is executed by the doppler processor 22.

Velocity estimation function 36 corresponds to Equation (2) above. Velocity estimation function 38 is similar, but introduces a $-\Delta$ shift of the (n−1)-th echo signal relative to the n-th echo signal, resulting in Equation (11) below:

$$R(T;nT,m\Delta) = \sum_{m=1}^{M} \sum_{n=1}^{N} z[nT,(m-1)\Delta]z^*[(n-1)T,m\Delta] \quad (11)$$

Velocity estimation function 40 also is similar, but instead introduces a $+\Delta$ shift of the (n−1)-th echo signal relative to the n-th echo signal, resulting in equation (12) below:

$$R(T;nT,m\Delta) = \sum_{m=1}^{M} \sum_{n=1}^{N} z[nT,m\Delta]z^*[(n-1)T,(m+1)\Delta] \quad (12)$$

Each velocity estimation 36–40 yields a formula of the type: $R(T,nT,m\Delta)=I(t)+jQ(t)$. At step 46, the power function for velocity estimation function step 36–40 is computed using equation (13) below:

$$P(T;nT,m\Delta)=[I^2+Q^2]^{1/2} \quad (13)$$

Of the three results, the velocity estimation function 36–40 corresponding to the power function with the highest magnitude is selected. The other two estimation functions are ignored. At step 48 an aliasing computation is performed on the selected estimation function.

The aliasing computation corresponds to the doppler phase shift calculation of equation (8): $\alpha T=\alpha_s T+2\pi m/\omega_0$. Taking the inverse tangent of equation (8) typically yields $\alpha_s T$ as the calculated Doppler shift. However, for high velocities, this yields a negative phase shift, which is an aliasing error. By calculating the power of the three alternative velocity estimation functions 36, 38, 40, the aliasing error is avoided. Specifically, only if the velocity estimation function 36 is selected, does $\alpha_s T$ become the derived doppler frequency shift for the current sample. If, instead, velocity estimation function 38 is selected, then the doppler frequency shift is $|\alpha_s T+2\pi/\omega_0|$ for the current sample. Similarly, if velocity estimation function 40 is selected, then the doppler shift frequency is $|\alpha_s T-2\pi/\omega_0|$ for the current sample. The doppler frequency then is subtracted out to achieve the flow velocity of a given sample point.

For alternative embodiments, additional partial shifts, $\Delta$, are introduced increasing the number of velocity estimation functions to select from. According to various embodiments, shifts of $\pm k\Delta$ are introduced where k=1,K to define 2K additional velocity estimation functions. By selecting the one of the 2K+1 velocity estimation functions with the highest power, the detectable frequency range, f, becomes: $-(2^K/2)f_s<f<(2^K/2)f_s$, where $f_s$ is the Doppler sampling frequency. In practice accurate estimation is achieved for a K limited value. The limit of K is dependent upon the flow characteristic within the sampling block. For example, if flow is uniform over an area spanning $\pm\Delta$, then K is limited to 1. If flow is uniform over a larger area, such as $\pm 2\Delta$, then K can be larger, (e.g., 2).

What is claimed is:

1. A doppler ultrasound method for estimating the velocity of a moving target at multiple sample points, comprising the steps of:

transmitting groups of ultrasound pulse signals towards the target, each group transmitted at a periodic interval;

receiving at least N groups of ultrasound echo signals caused by reflections of the transmitted groups off the target;

generating a set of at least M digitized samples for each received group, each sample of a given set spatially-displaced relative to other samples of the same given set, each received group temporally-displaced relative to other received groups;

defining a plurality of spatial-temporal averages for an m-th sample of an n-th group using spatial-temporal displaced sample pairs for each spatial-temporal average;

computing power for each of the defined spatial-temporal averages; and selecting one of the defined spatial-temporal averages for use in determining the doppler frequency shift of the m-th sample of the n-th received group, the selected one being that which has highest absolute value of power determined during the power computing step.

2. The method of claim 1, in which the step of defining comprises defining 2K spatial-temporal averages for an m-th sample of an n-th group using spatial-temporal displaced sample pairs for each one of said 2K spatial-temporal averages, wherein K is an integer.

3. The method of claim 2, further comprising, prior to the computing and selecting steps, the step of: defining a spatial-temporal average of a temporally-displaced sample pair comprising an m-th sample of an n-th received group and an m-th sample of an (n−1)th received group.

4. The method of claim 3, in which doppler shift frequency is detectable without aliasing artifacts over the following doppler shift frequency:

$$-(2^K/2)f_s<f<(2^K/2)f_s$$

where, $f_s$ is Doppler sampling frequency used for generating the set of at least M digitized samples; and wherein K is an integer and $2^K$ is a number of adjacent spatially displaced samples within a received group defining an area within which flow is uniform.

5. A doppler ultrasound method for estimating the velocity of a moving target at multiple sample points, comprising the steps of:

transmitting groups of ultrasound pulse signals towards the target, each group transmitted at a periodic interval;

receiving at least N groups of ultrasound echo signals caused by reflections of the transmitted groups off the target;

generating a set of at least M digitized samples for each received group, each sample of a given set spatially-displaced relative to other samples of the same given set, each received group temporally-displaced relative to other received groups;

defining a first spatial-temporal average of a temporally-displaced sample pair comprising an m-th sample of an n-th received group and an m-th sample of an (n−1)th received group;

defining a second spatial-temporal average of a first spatial-temporal displaced sample pair comprising an (m−1)th sample of the n-th received group and the m-th sample of an the (n−1)th received group;

defining a third spatial-temporal average of a second spatial-temporal displaced sample pair comprising the m-th sample of the n-th received group and an (m+1)th sample of the (n−1)th received group;

computing power for each of the first spatial-temporal average, second spatial-temporal average, and third spatial-temporal average; and selecting one of the first spatial-temporal average, second spatial-temporal average, and third spatial-temporal average for use in determining the doppler frequency shift of the m-th sample of the n-th received group, the selected one being that which has highest absolute value of power determined during the power computing step.

6. The method of claim 5, in which the steps of defining a first spatial-temporal average, defining a second spatial-temporal average, defining a third spatial-temporal average, computing, and selecting are repeated for each of the M samples of each of the N groups.

7. The method of claim 5, in which the second spatial-temporal average is defined as:

$$\sum_{m=1}^{M}\sum_{n=1}^{N} z[nT,(m-1)\Delta]z^*[(n-1)T,m\Delta]$$

where $z[nT,(m-1)\Delta]$ is the (m−1)th sample of the n-th received group, $z^*[(n-1)T,m\Delta]$ is the m-th sample of the (n−1)th received group and T is the periodic interval between successive transmitted groups.

8. The method of claim 5, in which the third spatial-temporal average is defined as:

$$\sum_{m=1}^{M}\sum_{n=1}^{N} z[nT,m\Delta]z^*[(n-1)T,(m+1)\Delta]$$

where $z[nT,m)\Delta]$ is the m-th sample of the n-th received group, $z^*[(n-1)T,(m+1)\Delta]$ is the (m+1)th sample of the (n−1)th received group and T is the periodic interval between successive transmitted groups.

9. The method of claim 5, in which doppler shift frequency is detectable without aliasing artifacts over a doppler shift frequency range between bounds of at least plus/minus spatial sampling frequency used for generating the set of at least M digitized samples.

10. An ultrasound medical diagnostic apparatus for estimating flow velocity within a target area of a patient, the apparatus comprising:

means for transmitting groups of ultrasound pulse signals towards the target, each group transmitted at a periodic interval;

means for receiving at least N groups of ultrasound echo signals caused by reflections of the transmitted groups off the target;

means for generating a set of at least M digitized samples for each received group, each sample of a given set spatially-displaced relative to other samples of the same given set, each received group temporally-displaced relative to other received groups; and a processor executing a computer program to perform the following steps:

defining a plurality of spatial-temporal averages for an m-th sample of an n-th group using spatial-temporal displaced sample pairs for each spatial-temporal average;

computing power for each of the defined spatial-temporal averages; and selecting one of the defined spatial-temporal averages for use in determining the doppler frequency shift of the m-th sample of the n-th received group, the selected one being that which has highest absolute value of power determined during the power computing step.

11. The apparatus of claim 10, in which the processor step of defining comprises defining 2K spatial-temporal averages for an m-th sample of an n-th group using spatial-temporal displaced sample pairs for each one of said 2K spatial-temporal averages, in which K is an integer.

12. The apparatus of claim 11, in which the processor further performs, in the computing and selecting steps, the step of: defining a spatial-temporal average of a temporally-displaced sample pair comprising an m-th sample of an n-th received group and an m-th sample of an (n−1)th received group.

13. The apparatus of claim 12, in which doppler shift frequency is detectable without aliasing artifacts over the following doppler shift frequency:

$$-(2^K/2)f_s < f < (2^K/2)f_s$$

where, $f_s$ is Doppler sampling frequency used for generating the set of at least M digitized samples; and wherein K is an integer and $2^K$ is a number of adjacent spatially displaced samples within a received group defining an area within which flow is uniform.

14. The apparatus of claim 11, in which for K=1, the spatial-temporal averages are defined as:

$$\sum_{m=1}^{M}\sum_{n=1}^{N} z[nT,(m-1)\Delta]z^*[(n-1)T,m\Delta]$$

where $z[nT,(m-1)\Delta]$ is an (m−1)th sample of an n-th received group, $z^*[(n-1)T,m\Delta]$ is an m-th sample of an (n−1)th received group and T is the periodic interval between successive transmitted groups; and $$\sum_{m=1}^{M}\sum_{n=1}^{N} z[nT,m\Delta]z^*[(n-1)T,(M+1)\Delta]$$

where $z[nT,m\Delta]$ is the m-th sample of the n-th received group, $z^*[(n-1)T,(m+1)\Delta]$ is an (m+1)th sample of the (n−1)th received group.

* * * * *